United States Patent [19]

Schipper

[11] Patent Number: 5,246,087
[45] Date of Patent: Sep. 21, 1993

[54] DEVICE FOR RADIALLY TRANSPORTING A MEDIUM TO A ROTATING STATION

[75] Inventor: Dirk J. Schipper, Enschede, Netherlands

[73] Assignee: Hulleman Techniek B.V., Netherlands

[21] Appl. No.: 737,213

[22] Filed: Jul. 29, 1991

[30] Foreign Application Priority Data

Aug. 1, 1990 [NL] Netherlands .................... 9001743

[51] Int. Cl.⁵ ............................................. F16C 43/04
[52] U.S. Cl. .................................... 184/5; 184/6; 277/15; 277/72 R; 384/473; 384/474; 384/483
[58] Field of Search ............... 384/477, 488, 483, 462, 384/466, 473, 474; 277/DIG. 8, 15, 59, 70, 71, 72 R, 79, 32, 28; 184/7.4, 5, 6

[56] References Cited

U.S. PATENT DOCUMENTS

| | | | |
|---|---|---|---|
| 2,242,184 | 5/1941 | Reuter | 277/59 |
| 2,610,097 | 9/1952 | Shelden et al. | 384/466 |
| 2,736,624 | 2/1956 | Schoenrock | 384/477 |
| 2,867,481 | 1/1959 | Hornbostel | 384/466 |
| 3,100,648 | 8/1963 | Lee | 277/59 |
| 3,542,442 | 11/1970 | Kent | 384/473 |
| 3,746,129 | 7/1973 | Knapp et al. | 184/14 |
| 3,853,328 | 12/1974 | Pierce | 277/72 R |
| 4,302,019 | 11/1981 | Hotger | 277/59 |
| 4,363,490 | 12/1982 | Kuehn | 277/15 |
| 4,549,822 | 10/1985 | Crates | 384/462 |
| 4,763,957 | 8/1988 | Poehlmann et al. | 384/474 |
| 4,988,218 | 1/1991 | Quaglia | 384/473 |

FOREIGN PATENT DOCUMENTS

| | | |
|---|---|---|
| 034728 | 1/1981 | European Pat. Off. . |
| 339204 | 2/1989 | European Pat. Off. . |
| 1083068 | 1/1955 | France . |
| 2149836 | 3/1973 | France . |
| 0749949 | 6/1956 | United Kingdom ............ 384/474 |

Primary Examiner—Ira S. Lazarus
Assistant Examiner—Alan B. Cariaso
Attorney, Agent, or Firm—Willian Brinks Olds Hofer Gilson & Lione

[57] ABSTRACT

A device for sealingly transporting medium, for instance lubricating oil, from a source to a receiving station rotatably movable relative thereto, which device comprises: a source for the medium; and a rotation bearing assembly comprising: at least one rotation bearing; means for receiving the medium from the source, transporting thereof through the rotation bearing assembly in at least partially radial direction and for feeding the medium to the receiving station; and mechanical sealing means.

26 Claims, 8 Drawing Sheets

DEVICE FOR RADIALLY TRANSPORTING A MEDIUM TO A ROTATING STATION

It is desired in many constructions that per time unit a determined quantity of substance is transferred continuously or intermittently from a stationary element such as a source to a rotating element without loss occurring of the medium for transporting. The source can for instance be coupled to the frame of a machine or a vehicle and the rotating element or receiving station can for instance form part of a rotating shaft. In the known art there exists no system or device that enables such a transfer of medium. For lubricating of a universal joint of a motor vehicle, for instance a goods vehicle, elaborate constructions have to be used which are expensive and require very regular maintenance.

The invention now offers a device for sealingly transporting medium, for instance lubricating oil, from a source to a receiving station rotatably movable relative thereto, which device comprises:
a source for the medium; and
a rotation bearing assembly comprising:
  at least one rotation bearing;
  means for receiving the medium from the source, transporting thereof through the rotation bearing assembly in at least partially radial direction and for feeding the medium to the receiving station; and
  mechanical sealing means.

The device can in particular be embodied such that the rotation bearing assembly comprises:
an outer cylinder stationary relative to the receiving means and having a medium feed; and
an inner cylinder which is rotatably movable together with the receiving station and which is coupled via the at least one rotation bearing to the outer cylinder, bounds with the outer cylinder and at least two sealing rings situated therebetween a passage space for the medium and which has a medium drain stationary relative to the receiving station.

The advantage of the use of rotation bearings is the small frictional moment between the stationary element and the rotating element, while great accuracy is ensured with respect to positioning and guiding between both elements It must nevertheless be ensured in all conditions that the medium for transfer cannot leak into the environment.

If the medium has a good lubricating action and is not aggressive with respect to the rotation bearings or the rotation bearing, an embodiment is preferred with sealing rings placed axially outside the or each rotation bearing.

Particularly when an axial bearing is used the device may be characterized by one rotation bearing which also serves as passage space.

In the case a medium is used which does not have a sufficiently good lubricating action and/or medium that is aggressive relative to the bearing ring, use is preferably made of sealing rings placed axially inside the or each rotation bearing.

In order to prevent penetration of dirt, dust and the like from outside into the rotation bearing assembly use can advantageously be made of two plates which are connected to the inner cylinder, extend over the axial ends of the rotation bearing assembly and each of which optionally also covers the edges thereof with a bent cylindrical wall. These plates very effectively throw out by centrifugal force the dirt coming from outside. The sealing is hereby greatly relieved from outside influences.

Use is made in a particular embodiment of pressure spring means co-acting with the sealing rings and improving the sealing. This variant can have the feature that the pressure spring means are operational in axial direction.

In another embodiment the device has the feature that a sealing ring is embodied as pressure spring element, for example in the form of a disc spring.

It is noted that use can be made of a combination of seals placed axially internally and externally.

In general the seals will be designed taking into account an anticipated operational pressure of the medium for transporting.

In certain conditions, for instance in lubrication systems, it may be the wish to transfer the medium intermittently, for example periodically, from the medium source to the receiving station. A possible example here is a shaft such as a drive or crank shaft of a truck. For such an application the medium can for instance only be transported through the device according to the invention when the truck is moving or standing still. For this purpose the device may be characterized by a dosing unit for intermittent dosed delivery of medium. Such a dosing unit is per se known. The dosing unit can be incorporated in the inner cylinder. Due to the pressure of the medium under the influence of energizing of the source a predetermined quantity of lubricant can be taken up into a storage space of the dosing unit. To this end the dosing unit comprises a spring-loaded, displaceable piston and a non-return valve construction. When the medium pressure falls away the stored medium is delivered under the influence of the spring pressure to the receiving station, in this case for instance a cardan joint.

In particular conditions the friction caused by the mechanical seals can result in comparatively large heat formation and losses. In a very specific embodiment of the device according to the invention use is made of a structure combining the advantages of the invention with an extremely low friction. In this embodiment the device according to the invention is characterized by:
an intermediate cylinder which is arranged between the inner cylinder and the outer cylinder and which is freely rotatable relative to the inner cylinder and the outer cylinder, wherein the friction between the intermediate cylinder and the inner cylinder is greater than the friction between the intermediate cylinder and the outer cylinder such that the intermediate cylinder is carried along by rotation of the inner cylinder;
coupling means actuable in the medium feed by pressure in the medium for coupling the intermediate cylinder to the outer cylinder; and
a medium dosing unit present in the intermediate ring for intermittent dosed delivery of medium.

In the situation where there is no medium pressure, the intermediate cylinder rotates together with the rotating inner cylinder as a consequence of the higher friction between the intermediate ring and the rotating cylinder than between the intermediate cylinder and the stationary cylinder. In the activated situation in which the medium is fed under pressure to the device, the ring is stopped. The sealing does not then have to function when there is a combination of high pressure and high sliding speeds. The quantity of medium for transferring is temporarily stored in the medium dosing unit so that in the passive situation (in which the intermediate cylinder is again carried along with the rotating inner cylinder) this stored quantity of medium is subsequently transported to the receiving station.

Attention is drawn to the fact that the medium dosing units are per se known and are commercially available under the trade name Hulleman Techniek B.V. (NL) and Willy Vogel A.G. (FRG).

The material of the mechanical seals can be of any suitable type. A hardenable steel type can be selected for the most usual applications. The counter-race can for instance be ball bearing steel of the type AISI-52100 with a hardness HRc in the order of 63. Both contact surfaces are after-treated to a CLA roughness value in the order of 0.05 μm. In the case of low medium pressures, use can be made of existing sealing rings of the type commercially available under the trade name Nilos.

The invention will now be elucidated with reference to the annexed drawing, in which.

Figure 9:
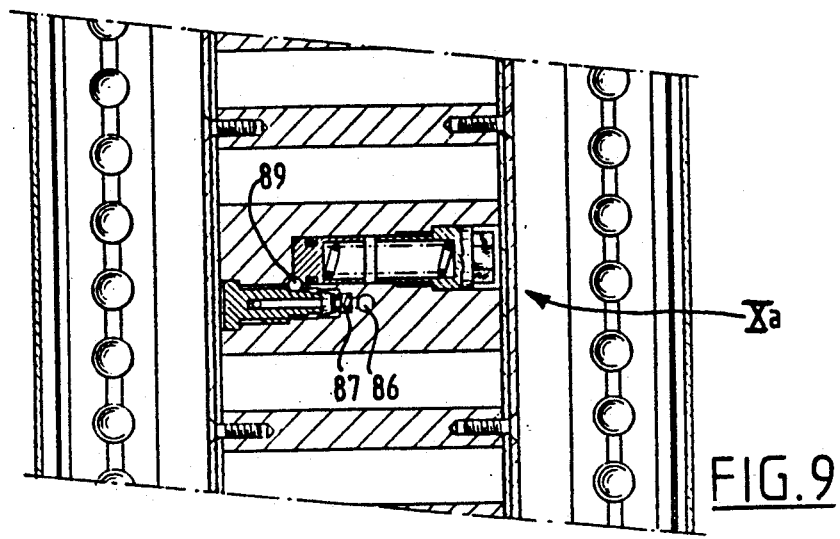
FIG. 9 shows the section IX—IX from FIG. 8.
Figure 10A:
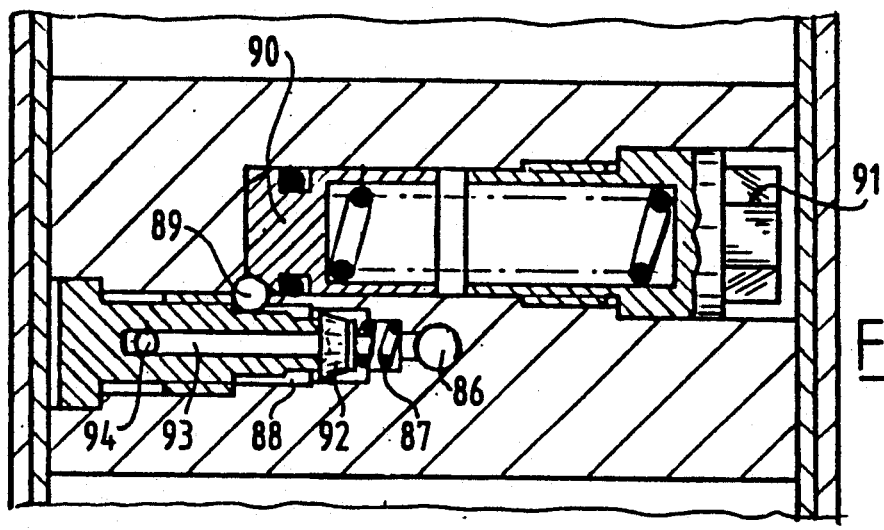
Figure 11:
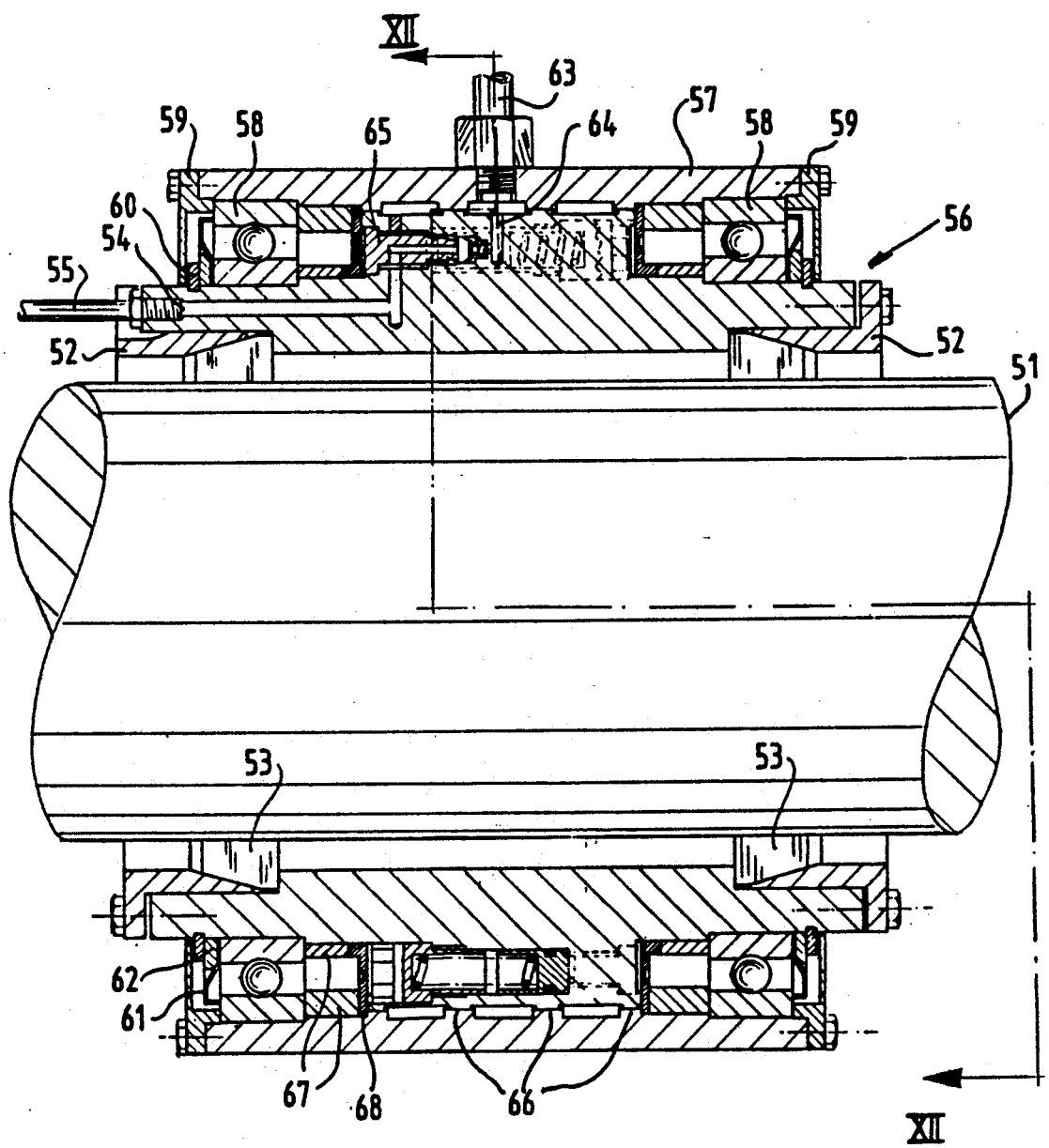
Figure 12:
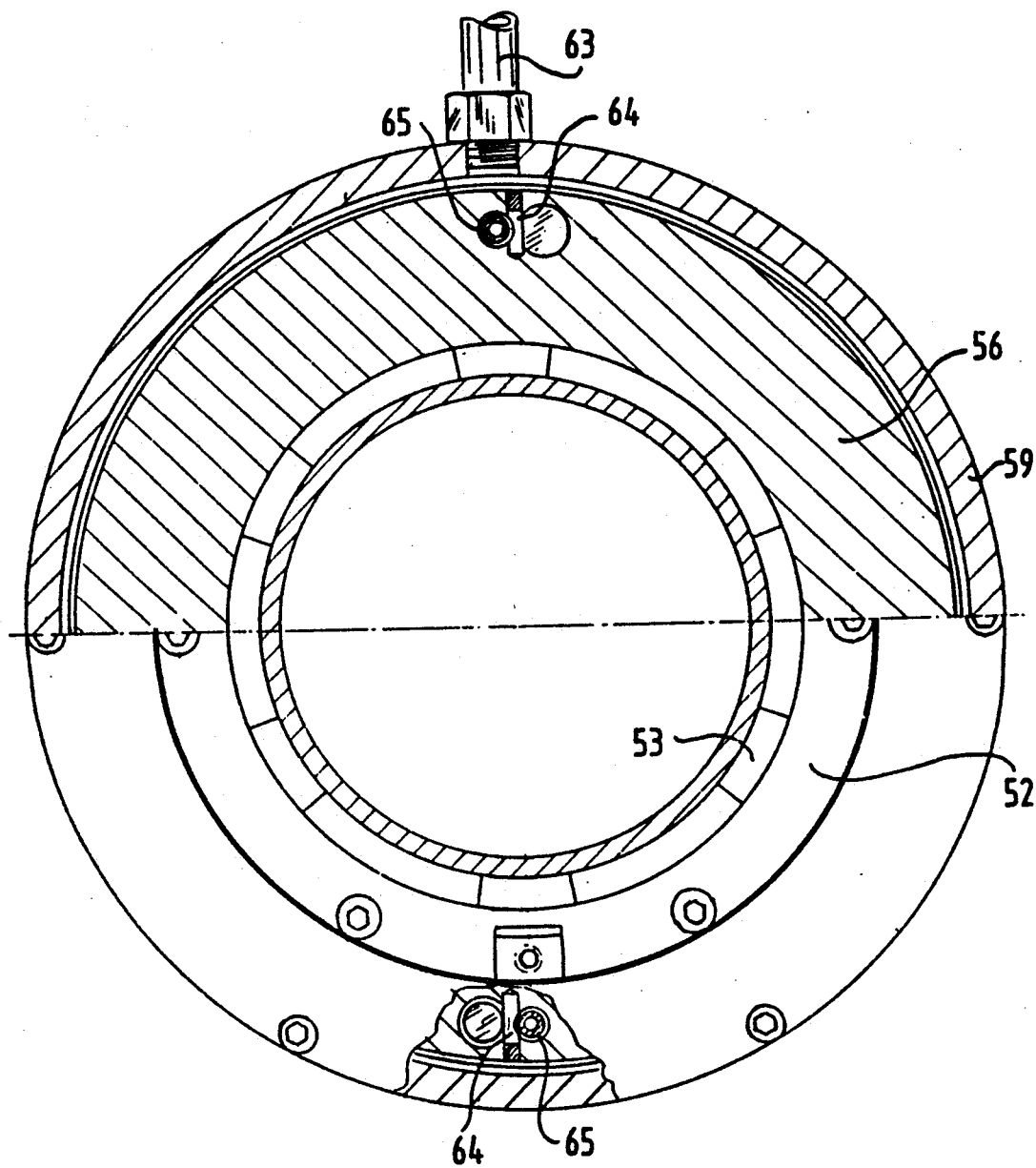

FIGS. 10a, b and c show the detail Xa of FIG. 9 in three operating positions of the medium dosing unit;

FIG. 11 shows a seventh embodiment partly in cross section and partly in side view; and FIG. 12 shows a cross section along the line XII—XII of FIG. 11.

In all the figures functionally corresponding components are designated with the same reference numerals.

Figure 1:
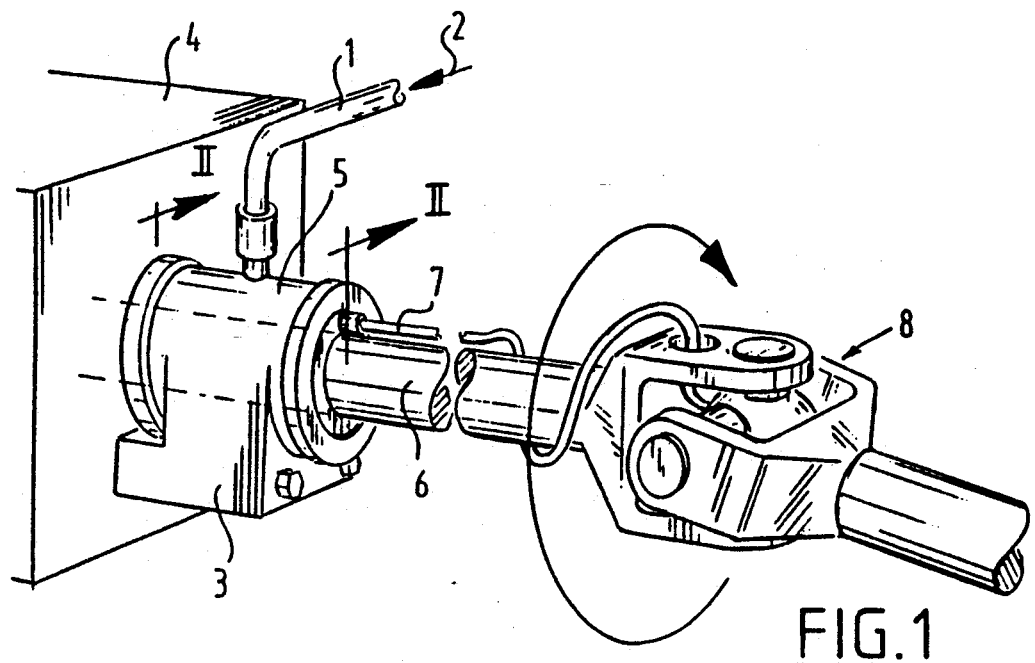
FIG. 1 shows a perspective view of a part of a device according to the invention.

FIG. 1 shows a medium feed conduit 1 in which medium is fed according to an arrow 2 from a source (not drawn) to a rotation bearing assembly 3, which will be further discussed hereinafter with reference to FIG. 2. The rotation bearing assembly 3 comprises a housing 5 that is stationary relative to a motor block 4 and in which a shaft 6 is rotatably mounted. The shaft 6 carries a medium conduit 7 through which the medium, in this case lubricating oil, is transported from the conduit 1 via the bearing unit 3 to a cardan joint 8 for lubrication thereof.

Figure 2:
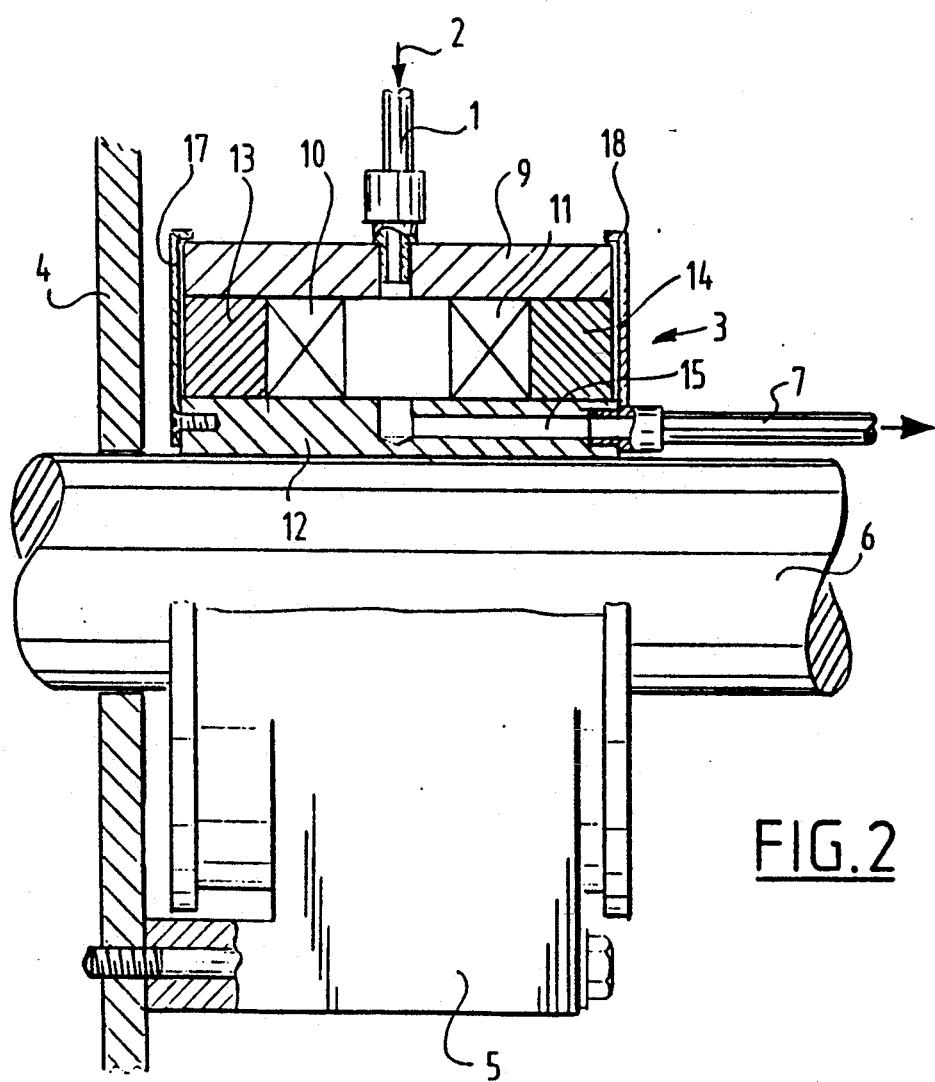
FIG. 2 shows the detail II—II of FIG. 1, partly in cross section and partly in side view.

FIG. 2 shows the construction of the bearing unit 3. The medium feed conduit 1 debouches inside an outer cylinder 9 which via rotation bearings 10, 11 is coupled freely rotatably to an inner cylinder 12. This is supported via the housing 5 by the motor block 4 and carries the shaft 6 so that this is rotatable relative to housing 5. Situated between the outer cylinder 9 and the inner cylinder 12 are shaft seals 13, 14, in this case rotating axially outside the deep groove ball bearings 10, 11. As will be apparent, the medium is transported through the space enclosed by the cylinders 9, 12 and the seals 13, 14. The medium is drained via a channel 15 in the inner cylinder 12 and via the medium conduit 7 so that the fluid travels externally of the shaft from the opening of said outer cylinder to the receiving station.

Attention is drawn to the fact that in this embodiment the ball bearings 10, 11 can come into contact with the medium, in this case lubricating oil. For transport of an aggressive or non-lubricating medium an arrangement can be recommended in which the axial positions of the ball bearings and the shaft seals are interchanged so that the ball bearings are protected from the effects of the transported medium.

Attached to the inner cylinder 12 at both axial ends are plates 17, 18 with bent edges. These effectively prevent penetration of dirt into the bearing unit 3. Due to the rotation they effectively throw outward any dirt that may penetrate inside.

Figure 3:
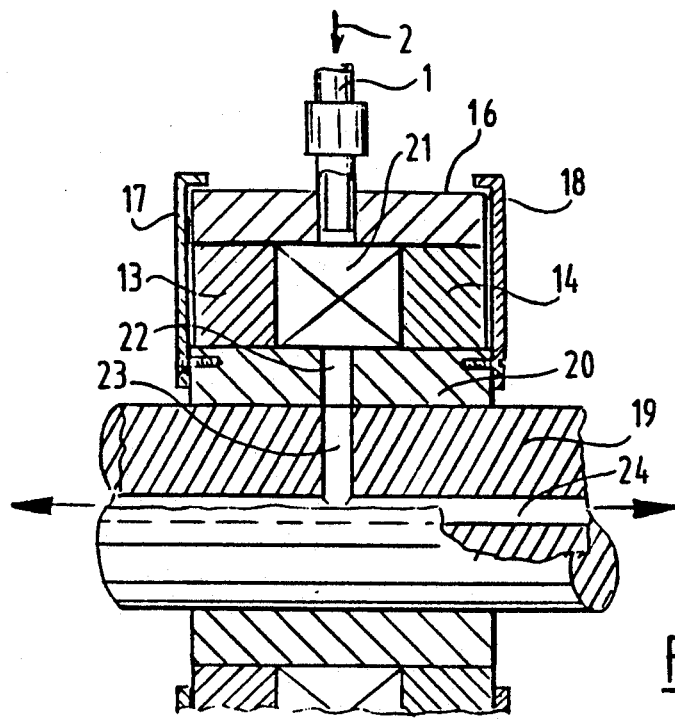
FIG. 3 is a view corresponding with FIG. 2 of a second embodiment.

FIG. 3 shows a second embodiment. This device comprises a shaft 19 supporting an inner cylinder 20. This co-acts by means of an axial ball bearing 21 with an outer cylinder 16. In this embodiment the medium is transported through the ball bearing 21 and reaches a channel 22 that is present in inner cylinder 20 and which connects onto a bore 23 in shaft 19, which debouches in turn onto a medium transport channel 24 in the shaft 19.

Figure 4:
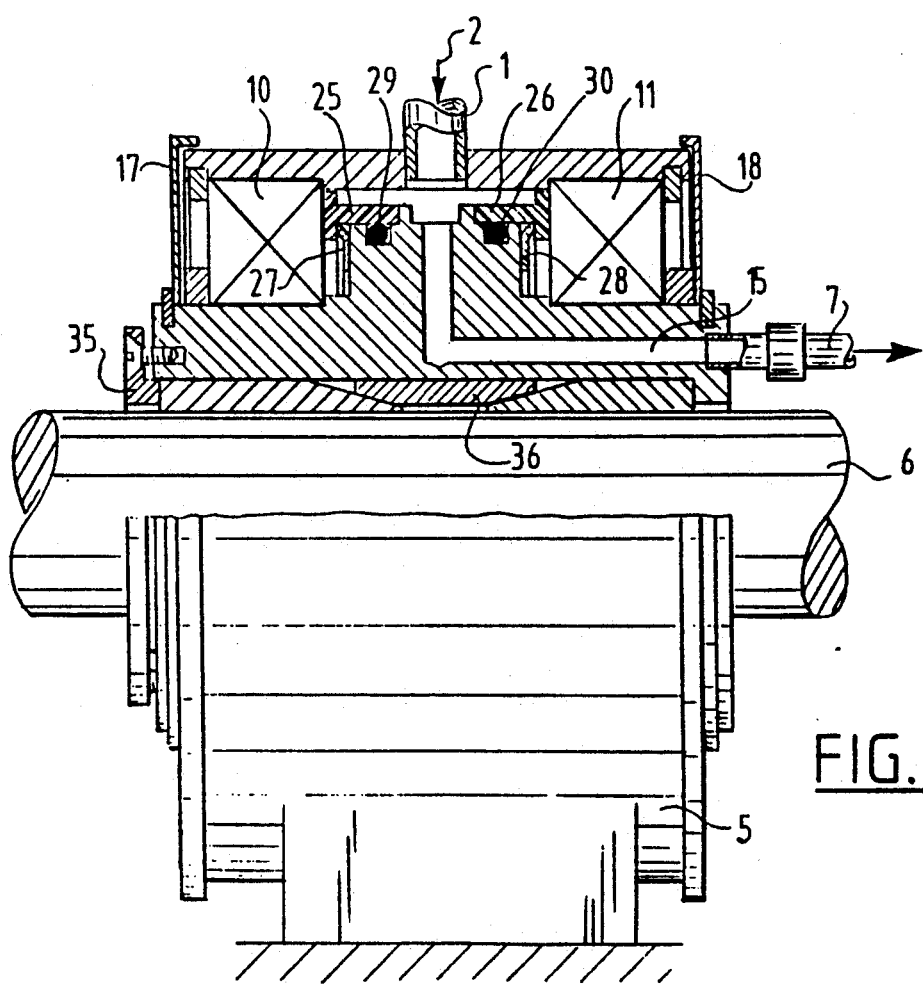
FIG. 4 shows a third embodiment.

FIG. 4 shows a third embodiment. The construction may not leak into the environment. Penetration of dirt from outside must also be prevented. As a rotating element must be sealed in conditions of high sliding speeds, use is made of the rotating shaft seal, or mechanical seal. The rotating shaft seal will have to function well at any pressure in the medium. Since such a pressure can moreover fluctuate considerably from case to case and depending on conditions, a "compensated" rotating shaft seal has been chosen for the embodiment of FIG. 4. The wear of the seal is hereby also restricted to a minimum. The sealing rings 25, 26 have an L-shape, or in this embodiment a T-shape.

Figure 5:
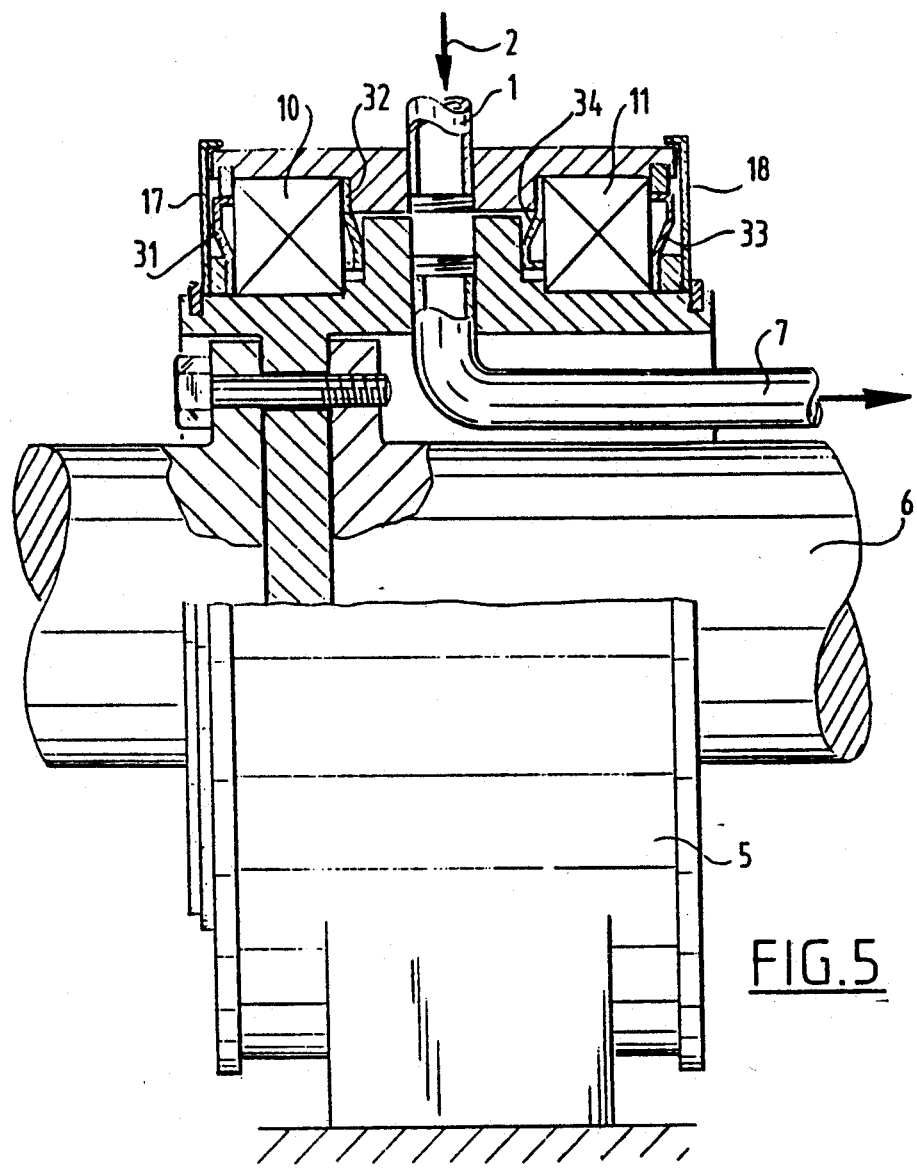
FIG. 5 shows a fourth embodiment.

The ratio of the different dimensions determines the compensation in respect of the pressure of the medium transported as according to the arrow 2. The material depends on the application. Hardened tool steel can for instance be used herefor. The axial inner face of the ball bearings 10, 11 can for instance be ball bearing steel AISI-52100 with a hardness HRc of approximately 63. Both contact surfaces aer polished to a CLA roughness value of 0.02 μm. If the pressure of the medium is low, use can be made of existing sealing rings, for example of the type commercially available under the trade name Nilos. Reference is made in this respect to FIG. 5. Spring elements 27, 28 improve the sealing by axial pressing-on. The radial sealing is furthered by two 0-rings 29, 30. Owing to its construction the device according to FIG. 4 is suitable for transporting medium under high pressure.

As a result of tightening a pressure sleeve 35 the device is clamped fixedly onto the shaft 6 due to the wedging co-action with a plastic wedge 36.

FIG. 5 shows a device designed for transporting medium under low pressure. Use is made here respectively of resilient sealing rings 31, 32 on both axial sides of the ball bearing 10 and 33, 34 on both sides of the ball bearing 11.

Figure 6:
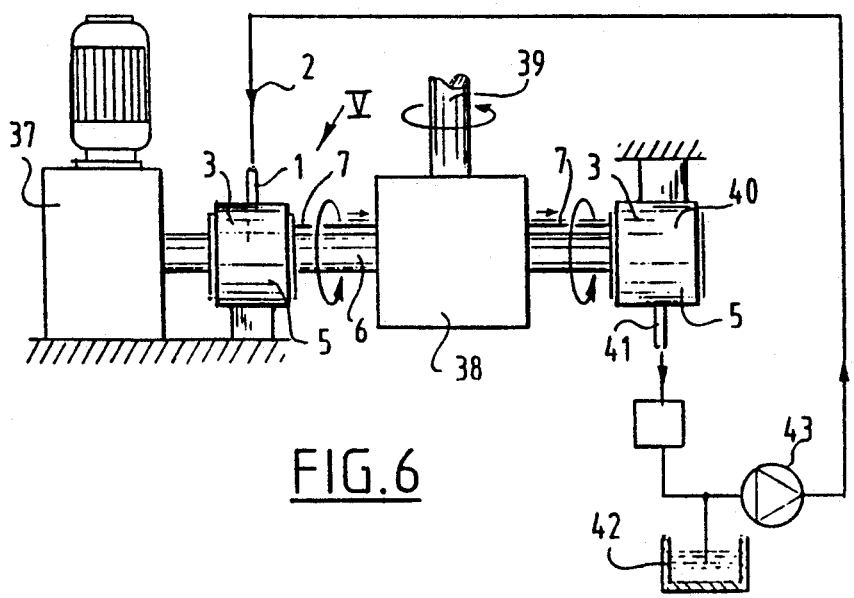
FIG. 6 shows a highly schematic view of a machine in which the invention is used.

FIG. 6 shows a schematic view of a machine with a motor unit 37. Via the shaft 6 this also drives a second shaft 39 by way of a right angle transmission 38. The medium conduit 7 provides lubrication of the right angle transmission 38 and, via a second device according to the invention designated 40 for the sake of convenience, the transported lubricating oil is carried in reverse direction relative to the above shown and discussed embodiments from the rotating shaft 7 back to a medium conduit 41 that is stationary relative to the motor unit 37, there to be taken up again into a hydraulic circuit with a storage vessel 42 and a pump 43. The lubricating oil is thus circulated in a closed circuit.

The FIGS. 11 and 12 show embodiments intended for continuous radial transport of medium.

Figure 8:
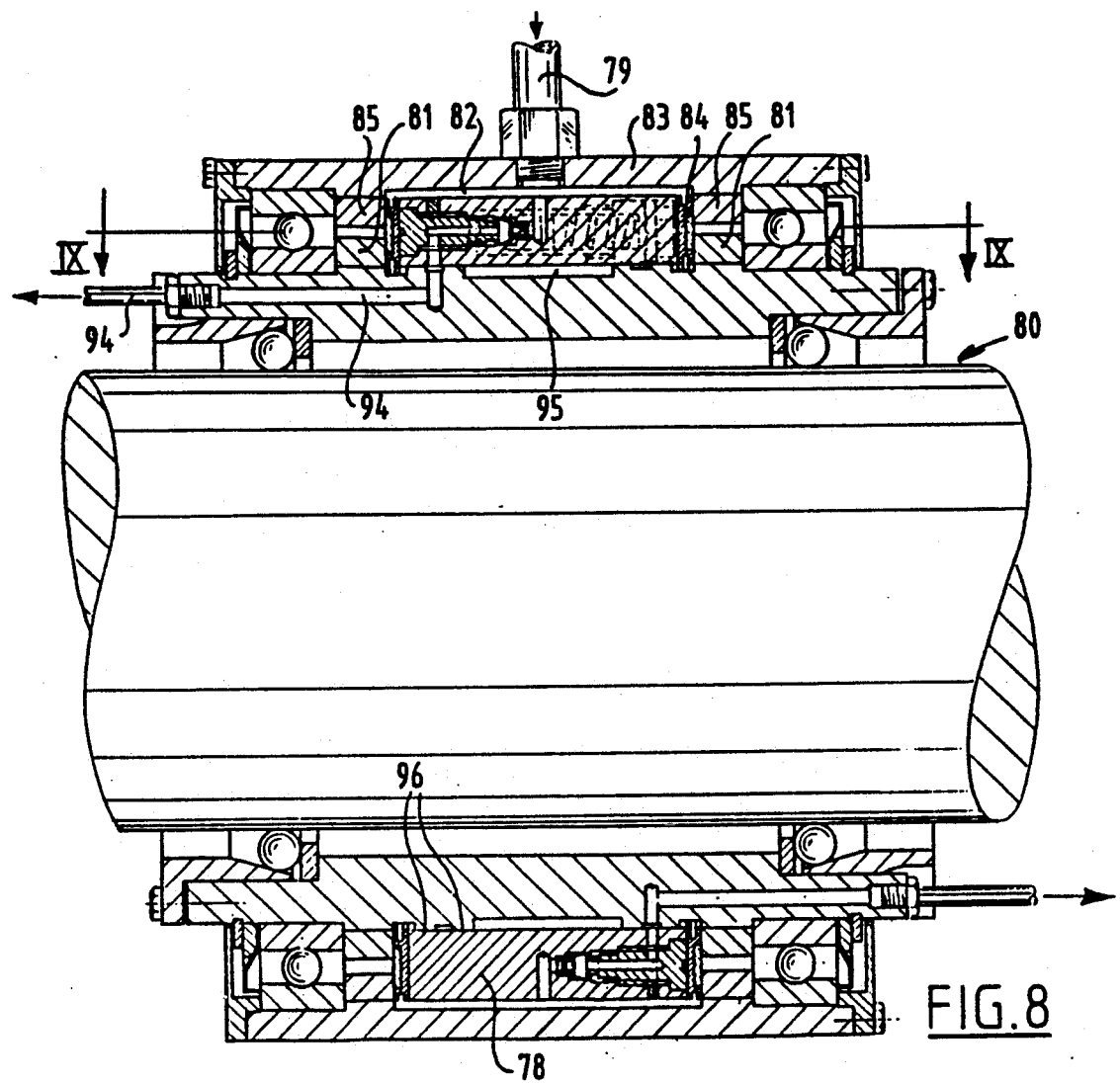
FIG. 8 shows a sixth embodiment partly in cross section and partly in side view.

The unit according to the invention is mounted on a shaft 51 by means of clamping sleeves 52 and wedge-shaped bodies 53. Instead of wedge-shaped bodies, balls in combination with a supporting ring can also be used, as shown in FIGS. 8, 9, 12. Present in the clamping sleeve 52 is an opening 54 for connecting a drain conduit 55 to the rotor 56. This rotor 56 rotates very accurately relative to the stator 57 through use of the rotation bearings 58. These rotation bearings 58 are fixedly joined with their outer sides to the stator 57 by means of covering plates 59. The inner sides of the bearings 58 are joined to the rotor 56 using a gasket 60 via the sealing ring 61 of the Nilos type and gasket 62. The flow of the medium in the unit takes place via feed 63 through channel 64 to a medium dosing unit 65. This per se known dosing unit is equipped for intermittently, for instance periodically, receiving and delivering a predetermined quantity of medium. The operation of this dosing unit 65 will be further discussed hereinbelow.

Sealing takes place through narrow, annular slits 66, between which a film of the medium is located. Such a sealing is per se known as viscous sealing. According to the invention however there is also a mechanical sealing. This is a flexible sealing 67, 68. As a result of the presence of the viscous sealing 66 the pressure at the location of the mechanical sealing 67, 68 will be considerably lower than the pressure under which the medium is supplied. The remaining pressure ensures that the mechanical sealing will bend whereby the degree of sealing between the flexible ring 12 and the ring 13 will increase. During energizing of the pressure source and the associated supply of medium under pressure the friction in the mechanical sealing will increase for a short time, simultaneously improving the sealing properties. After the medium source is again deactivated the friction will once again decrease.

Figure 7:
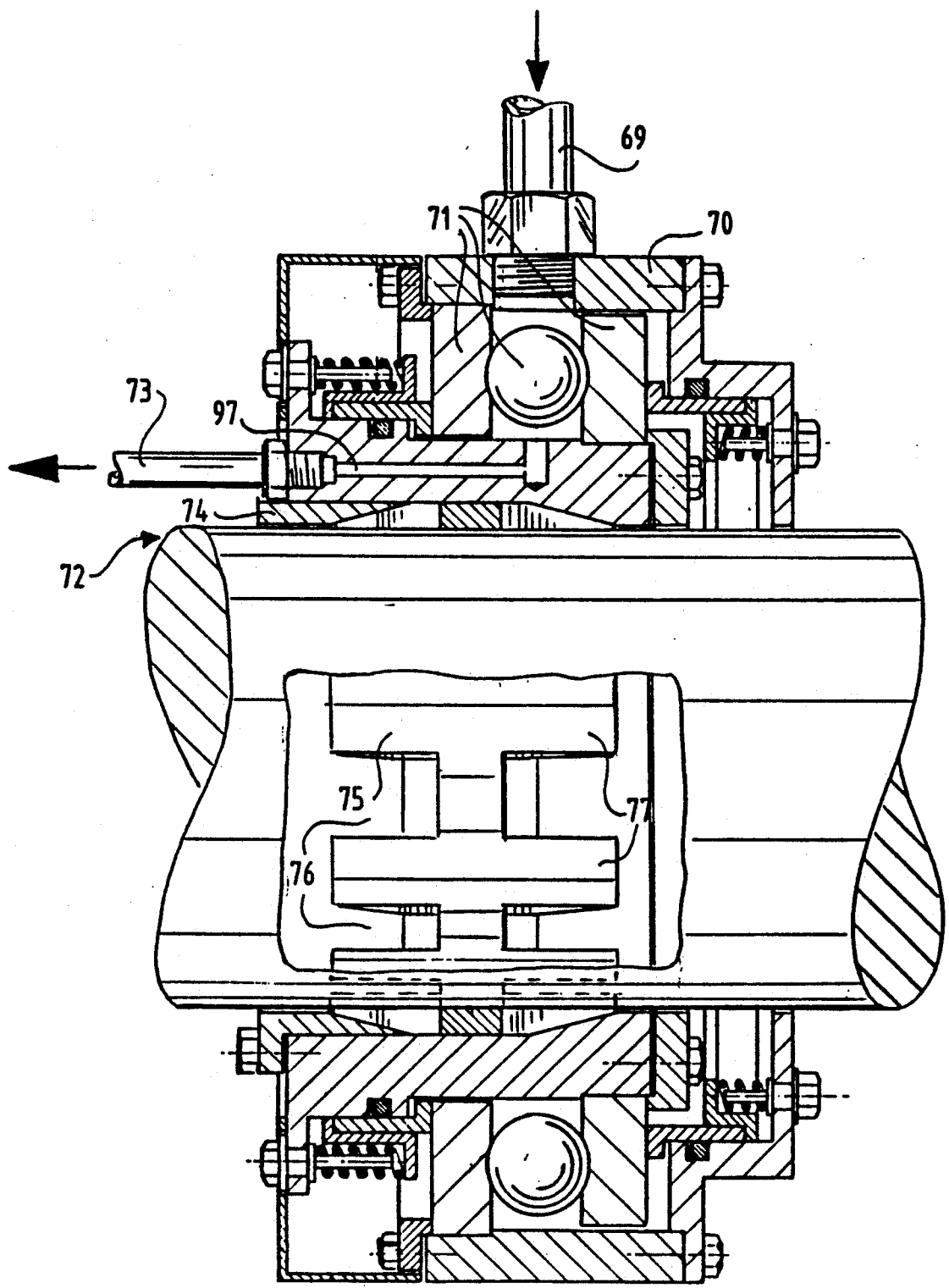
FIG. 7 shows a fifth embodiment partly in cross section and partly in side view.

FIG. 7 shows an embodiment which makes it possible to transfer the medium through the rotation bearing to the rotor. In this respect reference is also made to FIG. 3. Via the feed conduit 69 which is connected to the stator 70 the medium flows via the rotation bearing 71 and a conduit 97 in the rotor 72 to a drain conduit 73. In this embodiment the sealing is realized by means of the compensated rotating sealing as shown in FIG. 4 and therein discussed. The clamping unit consisting of a clamping sleeve 74 and a diaphragm ring 75 provides fixed connection of the unit to the shaft. As FIG. 7 shows clearly, the diaphragm ring 75 is provided with a number of longitudinal slits 76 which bound clamping lips 77. This construction ensures a radial freedom of movement necessary to obtain a clamping action.

Reference is now made to FIGS. 8, 9 and 12. These figures show an embodiment of the device according to the invention which enables intermittent medium transport with extremely low friction and with excellent sealing properties.

The construction displays a great similarity to that of FIGS. 11 and 12. In this case however use is made of an additional rotating element. This element is embodied as an intermediate ring between the rotor and the stator and is freely rotatable relative to both. The advantage of the construction to be described below is that the friction is considerably lower still than in the construction according to FIGS. 11 and 12, while the sealing, despite the fact that it can be very simple in structure, has no tendency whatever to leakage, due to the manner in which the device according to this embodiment can be used. The sealing at the moment of transport of medium takes place between bodies not moving relative to each other. The structure and operation of this embodiment will now be described.

Figure 10B:
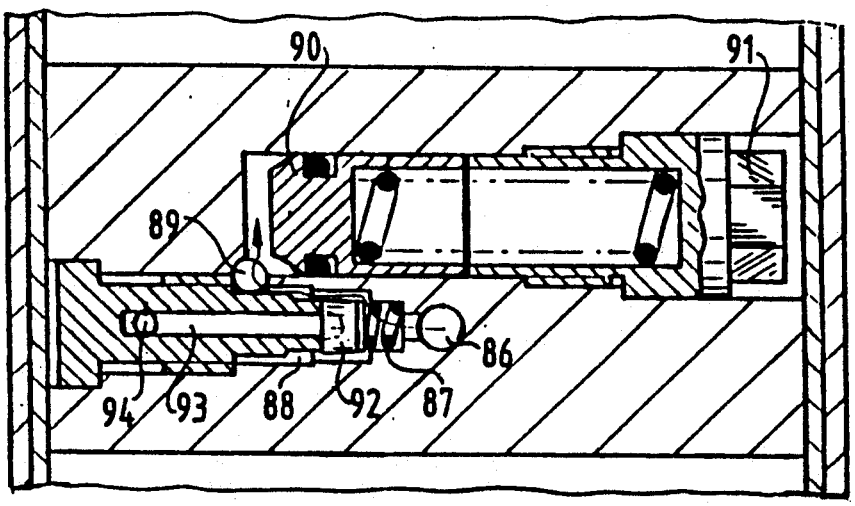
Figure 10C:
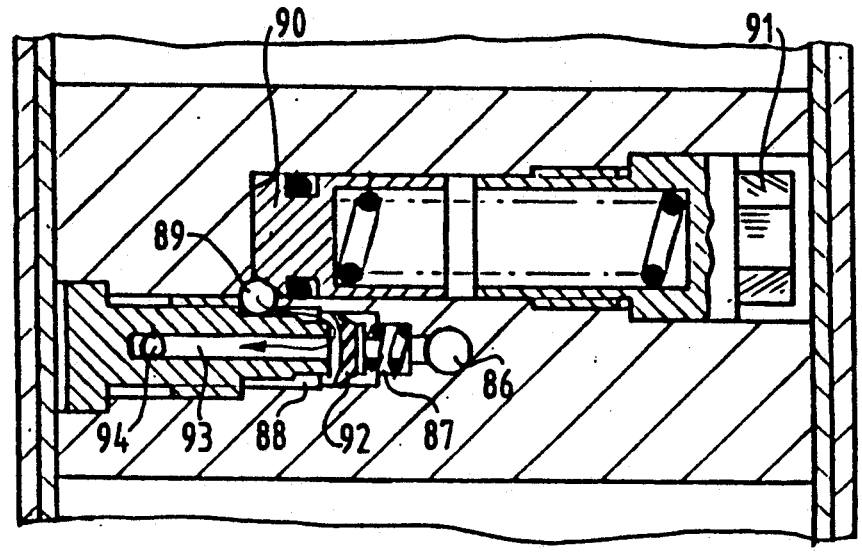

The intermediate cylinder 78 shown in FIG. 8 comprises a desired number of dosing units, which are available commercially. The number thereof is determined by the number of points which have to receive a required quantity of medium. In the situation where no medium under pressure is being fed via the feed conduit 79, the intermediate cylinder 78, the rotor 80 and friction rings 81 rotate together. At the moment when medium under pressure is supplied, the pressure in the space 82 between the intermediate cylinder 78 and a stationary element, such as the stator 83 ensures that an engagement element, such as the sealing ring 84 is brought in con with the stationary friction ring 85. Due to the friction between the sealing ring 84 and the stationary friction ring 85 the intermediate cylinder has its rate of rotation decrease with respect to the shaft or rotor 80 so that the intermediate cylinder 78 is braked. It is noted that the underside, i.e. the most inward radial side, of the sealing ring 84 is not activated by the pressure in the feed conduit 79. The sealing ring 84 and with it the intermediate cylinder 78 come to a standstill after a time relative to the stationary friction ring 85, while the rotor 80 can still be turning relative to the stator 83. After a time the intermediate cylinder 78 and the friction ring 81 come to a complete standstill. The sealing now only has to fulfil its function at a determined medium pressure, while there is no longer any difference in speed between the components in question. Wear can only occur during braking of the intermediate cylinder 78. The duration of the above described phase is determined for a given construction by the magnitude of the viscous friction generated by the friction rings. At the same time the intermediate cylinder 78 is braked the dosing unit to be described hereinbelow is filled with the desired quantity of medium to be transferred. The medium is fed via the conduit 86, 87 (FIGS. 9, 10) to a space 88. In this space the medium then presses via opening 89 against plunger 90. This is hereby displaced in the direction of stop 91.

After the pressure in the feed conduit 79 has fallen away, the plunger 90 can again become operational. The medium enters the space 88 via the opening 89 and subsequently pushes collar 92 to the right in the figure whereby conduit 93 is opened and the medium is fed via conduit 93 to the drain conduit 94.

Simultaneously with the falling away of pressure in the feed conduit 79 the contact between stationary friction ring 85 and the sealing ring 84 is broken. As a result of the friction between the intermediate cylinder 78 and the rotor 80 now being higher than the friction between the intermediate cylinder 78 and the stator 83, the intermediate cylinder 78 is again set into rotation.

In this embodiment the sealing is optimal under conditions of low friction and negligible wear. In the pressureless situation in which no medium under pressure is being supplied, the viscous friction is determined only by the medium in the space 82 and that at the location of the contact between the sealing ring 84 and the friction ring 85. During the activated condition, in which medium is supplied under pressure, the stationary viscous friction is determined by the medium in the annular space 95 between the intermediate cylinder 78 and the rotor 80 and in the contact surfaces designated with 96. This friction is diverse orders of magnitude lower than in known constructions. The useful life of a unit of this type is hereby considerably longer than that of known units.

I claim;

1. An apparatus for transporting a fluid from a fluid source to a receiving station rotatable relative to the fluid source, comprising:
    a rotation bearing assembly comprising an outer housing with an opening, an inner shaft rotatable relative to the outer housing, at least one rotation bearing between the inner shaft and the outer housing;
    an inlet exterior of said shaft and connected to said opening of said outer housing for receiving the fluid from the fluid source and transporting said fluid to said rotation bearing assembly;
    a seal for preventing loss of the fluid between the inner shaft and the outer housing;
    a carrying conduit mounted to and exterior to the rotatable shaft for carrying the fluid to the receiving station and so that the fluid travels externally of the shaft from the opening of said outer housing to the receiving station; and
    means for transporting the fluid from the inlet to the carrying conduit at least partially in a radial direction relative to the rotatable shaft.

2. The apparatus of claim 1, wherein the rotation bearing assembly further includes:
    an outer cylinder which is stationary relative to the fluid inlet;
    an opening in the outer cylinder to which the fluid inlet is connected, through which the fluid can pass;
    an inner cylinder rotatable together with the shaft, coupled to the outer cylinder by the at least one rotation bearing;
    two sealing rings between the inner and outer cylinders, forming seals for preventing fluid loss from between the cylinders;
    a passage between the two sealing rings for receiving fluid from the opening in the outer cylinder; and
    a drain in the inner cylinder which connects the passage to the carrying conduit.

3. The apparatus of claim 2, wherein the rotation bearing assembly includes two rotation bearings coupling the inner and outer cylinders, positioned between the sealing rings such that the opening in the outer cylinder and the drain in the inner cylinder are between the rotation bearings.

4. The apparatus of claim 2, wherein the rotation bearing assembly includes two rotation bearings coupling the inner and outer cylinders, positioned such that the two sealing rings are between the rotation bearings.

5. The apparatus of claim 2, wherein the rotation bearing assembly includes a single rotation bearing positioned between the two sealing rings and also between the opening and the drain.

6. The apparatus of claim 1, further comprising protection plates at both ends of the rotation bearing assembly for assisting in the prevention of fluid loss between the inner shaft and the outer housing.

7. The apparatus of claim 1, wherein the means for transporting the fluid from the inlet to the carrying conduit comprises a dosing unit for regulating the fluid transport such that the fluid is fed to the carrying conduit intermittently.

8. The apparatus of claim 1, wherein said inlet is perpendicular to the rotational axis of the inner shaft.

9. An apparatus for transporting a fluid from a fluid source to a receiving station, comprising:
    an inlet for receiving fluid from the fluid source;
    an outer cylinder which is stationary relative to the inlet, having an opening through which fluid from the inlet can pass;
    an inner cylinder rotatable relative to the outer cylinder, having a drain through which fluid can pass, wherein said inlet is located exteriorly of said inner cylinder and connected to said opening of said outer cylinder for receiving the fluid from the fluid source and transporting said fluid to said outer cylinder;
    coupling means between the inner and outer cylinders for rotatably coupling the inner cylinder to the outer cylinder, so that said outer cylinder rotates relative to said inner cylinder;
    a passage between the inner and outer cylinders configured such that fluid is transported from the opening in the outer cylinder to the drain in the inner cylinder, at least partially in a radially direction;
    sealing means between the inner and outer cylinders for preventing leakage of fluid from the passage;
    a rotatable shaft located inside the inner cylinder; and
    a carrying conduit connected to the drain, for carrying fluid to a receiving station, wherein said carrying conduit is located exterior to the rotatable shaft for carrying the fluid to the receiving station and so that the fluid travels externally of the shaft from the opening of said outer cylinder to the receiving station.

10. The apparatus of claim 9, wherein the sealing means comprises sealing rings on both sides of the passage.

11. The apparatus of claim 9, wherein said inlet is perpendicular to the rotational axis of the inner cylinder.

12. A rotation bearing assembly for transporting fluid at least partially in a radial direction from a fluid inlet to a receiving station, comprising:
    an outer cylinder which is stationary relative to the fluid inlet, having an opening through which fluid from the inlet can pass;
    an inner cylinder rotatable relative to the outer cylinder, having a drain through which fluid can pass, wherein said fluid inlet is located exteriorly of said inner cylinder and connected to said opening of said outer cylinder for transporting said fluid to said outer cylinder;
    one or more rotation bearings rotatably coupling the inner cylinder to the outer cylinder, so that said outer cylinder rotates relative to said inner cylinder;
    two sealing rings between the inner and outer cylinders positioned on both sides of the opening and the drain such as to define a fluid passage between the opening and the drain, the sealing rings acting to prevent fluid leakage in an axial direction between the inner and outer cylinder; protection plates at both ends of the inner and outer cylinders which at least partially overlap the edges of the inner and outer cylinders, to further prevent fluid leakage;

a rotatable shaft located inside the inner cylinder; and a carrying conduit connected to the drain, for carrying fluid to a receiving station, wherein said carrying conduit is located exterior to the rotatable shaft for carrying the fluid to the receiving station and so that the fluid travels externally of the shaft from the opening of said outer cylinder to the receiving station.

13. The apparatus of claim 12, wherein said inlet is perpendicular to the rotational axis of the inner cylinder.

14. An apparatus for transporting a fluid from a fluid source to a receiving station rotatable relative to the fluid source, comprising;

an inlet for receiving the fluid from the source;

a rotation bearing assembly connected to the inlet, comprising:

(a) a stationary element with an opening to which the fluid inlet is connected and through which said fluid passes;

(b) an inner shaft rotatable relative to the stationary element;

(c) an intermediate cylinder comprising an engagement element, wherein the intermediate cylinder is positioned between and adjacent to the stationary element and the inner shaft and rotatable with respect to each;

(d) a space between said intermediate cylinder and said stationary element to receive said fluid from said fluid inlet; and wherein said fluid present in said space produces a pressure sufficient to have said engaging element make contact with said stationary element so as to decrease the rate of rotation of said intermediate cylinder with respect to said inner shaft.

15. The apparatus of claim 14, comprising at least one rotation bearing between the inner shaft and the stationary element.

16. The apparatus of claim 14, comprising a seal for preventing loss of the fluid between the inner shaft and the stationary element.

17. The apparatus of claim 14, comprising a carrying conduit mounted to the rotatable shaft for carrying the fluid to the receiving station, and means for transporting the fluid from the inlet to the carrying conduit at least partially in a radial direction relative to the rotatable shaft.

18. The apparatus of claim 14, wherein said engagement element comprises a sealing ring to seal said fluid in said space; and wherein said intermediate cylinder comprises a drain conduit connecting said space to a carrying conduit.

19. The apparatus of claim 18, comprising at least one dosing unit in the intermediate cylinder for regulating the fluid transport such that fluid is fed to the drain conduit intermittently.

20. The apparatus of claim 14, wherein the relative friction between the inner shaft, intermediate cylinder, and stationary element is such that:

(a) when no fluid under pressure is being fed to the space, the amount of friction between the inner shaft and the intermediate cylinder is greater than the amount of friction between the intermediate cylinder and the stationary element so that the inner shaft and intermediate cylinder rotate together and (b) when fluid under pressure is supplied to the space, the amount of friction between the stationary element and the intermediate cylinder is greater than the amount of friction between the intermediate cylinder and the inner shaft element so that the intermediate cylinder is braked.

21. The apparatus of claim 20, comprising a friction ring to engage said engagement element to brake said intermediate cylinder when fluid pressure is supplied.

22. An apparatus for transporting a fluid from a fluid source is a receiving station rotatable relative to the fluid source, comprising:

a rotation bearing assembly comprising an outer housing with an opening, an inner shaft rotatable relative to the outer housing, at least one rotation bearing between the inner shaft and the outer housing;

an inlet exterior of said shaft and connected to said opening of said outer housing for receiving the fluid from the fluid source and transporting said fluid to said rotation bearing assembly;

a seal for preventing loss of the fluid between the inner shaft and the outer housing;

the rotation bearing assembly further including a carrying conduit mounted to and exterior to the rotatable shaft for carrying the fluid to the receiving station;

means for transporting the fluid from the inlet to the carrying conduit at least partially in a radial direction relative to the rotatable shaft;

wherein the rotation assembly further includes:

(1) an outer cylinder which is stationary relative to the fluid inlet;

(2) an opening in the outer cylinder to which the fluid inlet is connected, through which the fluid can pass;

(3) an inner cylinder rotatable together with the shaft, coupled to the outer cylinder by the at least one rotation bearing;

(4) two sealing rings between the inner and outer cylinders, forming seals for preventing fluid loss from between the cylinders;

(5) a passage between the two sealing rings for receiving fluid from the opening in the outer cylinder;

(6) a drain in the inner cylinder which connects the passage to the carrying conduit; and (7) one or more pressure springs acting upon each sealing ring to strengthen the seals between the inner and outer cylinders.

23. The apparatus of claim 22, wherein the pressure springs are arranged to apply pressure at least partially in an axial direction such as to bias the sealing rings toward the rotation bearings.

24. An apparatus for transporting a fluid from a fluid source to a receiving station rotatable relative to the fluid source, comprising:

a rotation bearing assembly comprising an outer housing with an opening, an inner shaft rotatable relative to the outer housing, at least one rotation bearing between the inner shaft and the outer housing;

an inlet exterior of said shaft and connected to said opening of said outer housing for receiving the fluid from the fluid source and transporting said fluid to said rotation bearing assembly;

a seal for preventing loss of the fluid between the inner shaft and the outer housing;

the rotation bearing assembly further including a carrying conduit mounted to and exterior to the rotatable shaft for carrying the fluid to the receiving station;

means for transporting the fluid from the inlet to the carrying conduit at least partially in a radial direction relative to the rotatable shaft;

wherein the rotation assembly further includes:
  (1) an outer cylinder which is stationary relative to the fluid inlet;
  (2) an opening in the outer cylinder to which the fluid inlet is connected, through which the fluid can pass;
  (3) an inner cylinder rotatable together with the shaft, coupled to the outer cylinder by the at least one rotation bearing;
  (4) two sealing rings between the inner and outer cylinders, forming seals for preventing fluid loss from between the cylinders and wherein each sealing ring comprises a pressure spring;
  (5) a passage between the two sealing rings for receiving fluid from the opening in the outer cylinder;
  (6) a drain in the inner cylinder which connects the passage to the carrying conduit.

25. An apparatus for transporting a fluid from a fluid source to a receiving station, comprising:

an inlet for receiving fluid from the fluid source;

an outer cylinder which is stationary relative to the inlet, having an opening through which fluid from the inlet can pass;

an inner cylinder rotatable relative to the outer cylinder, having a drain through which fluid can pass, wherein said inlet is located exteriorly of said inner cylinder and connected to said opening of said outer cylinder for receiving the fluid from the fluid source and transporting said fluid to said outer cylinder;

coupling means comprising a ball bearing located between the inner and outer cylinders for rotatably coupling the inner cylinder to the outer cylinder;

a passage between the inner and outer cylinders configured such that fluid is transported from the opening in the outer cylinder to the inner cylinder, at least partially in a radially direction;

sealing means between the inner and outer cylinder for preventing leakage of fluid from the passage; and a carrying conduit connected to the drain, for carrying fluid to a receiving station.

26. An apparatus for transporting a fluid from a fluid source to a receiving station, comprising:

an inlet for receiving fluid from the fluid source;

an outer cylinder which is stationary relative to the inlet, having an opening through which fluid from the inlet can pass;

an inner cylinder rotatable relative to the outer cylinder, having a drain through which fluid can pass, wherein said inlet is located exteriorly of said inner cylinder and connected to said opening of said outer cylinder for receiving the fluid from the fluid source and transporting said fluid to said outer cylinder;

coupling means between the inner and outer cylinders for rotatably coupling the inner cylinder to the outer cylinder;

a passage between the inner and outer cylinders configured such that fluid is transported from the opening in the outer cylinder to the drain in the inner cylinder, at least partially in a radially direction;

sealing means between the inner and outer cylinders for preventing leakage of fluid from the passage, wherein the sealing means comprises sealing rings on both sides of the passage;

a carrying conduit connected to the drain, for carrying fluid to a receiving station; and springs for applying pressure against the sealing rings to strengthen the seals between the inner and outer cylinders.

* * * * *

UNITED STATES PATENT AND TRADEMARK OFFICE
CERTIFICATE OF CORRECTION

PATENT NO. : 5,246,087
DATED : September 21, 1993
INVENTOR(S) : Dirk J. Schipper It is certified that error appears in the above-indentified patent and that said Letters Patent is hereby corrected as shown below:

In column 1, line 46, after "elements" insert --.--.

In column 4, line 44, delete "aer" and insert --are-- therefor.

In column 6, line 24, delete "in con" and insert --into contact-- therefor.

IN THE CLAIMS

Col. 10, claim 22, line 2, delete "is" and insert --to-- therefor.

Col. 12, claim 25, line 20, delete "radially" and insert --radial-- therefor.

UNITED STATES PATENT AND TRADEMARK OFFICE
CERTIFICATE OF CORRECTION

PATENT NO. : 5,246,087
DATED : September 21, 1993
INVENTOR(S) : Dirk J. Schipper It is certified that error appears in the above-indentified patent and that said Letters Patent is hereby corrected as shown below:

IN THE CLAIMS

Col. 12, claim 25, line 21, delete "cylinder" and insert --cylinders-- therefor.

Col. 12, claim 26, line 20, delete "radially" and insert --radial-- therefor.

Signed and Sealed this

Eighteenth Day of October, 1994

Attest:

BRUCE LEHMAN

Attesting Officer

Commissioner of Patents and Trademarks